United States Patent
McPhail et al.

(10) Patent No.: US 11,732,814 B2
(45) Date of Patent: Aug. 22, 2023

(54) PLUG VALVE ASSEMBLY

(71) Applicant: SPM Oil & Gas Inc., Fort Worth, TX (US)

(72) Inventors: James D. McPhail, Peoria, IL (US); Peter Allan Manos, McHenry, IL (US); David H. Graef, Spring Grove, IL (US); Daniel Stumpo, Barrington, IL (US)

(73) Assignee: SPM Oil & Gas Inc., Fort Worth, TX (US)

( * ) Notice: Subject to any disclaimer, the term of this patent is extended or adjusted under 35 U.S.C. 154(b) by 1 day.

(21) Appl. No.: 17/505,616

(22) Filed: Oct. 19, 2021

(65) Prior Publication Data
US 2023/0119815 A1    Apr. 20, 2023

(51) Int. Cl.
*F16K 5/22* (2006.01)
*F16K 5/04* (2006.01)

(52) U.S. Cl.
CPC ............ *F16K 5/225* (2013.01); *F16K 5/0442* (2013.01); *F16K 5/0471* (2013.01)

(58) Field of Classification Search
CPC ...... F16K 5/225; F16K 5/0442; F16K 5/0471; F16K 5/22
USPC ............................ 251/304–317.01, 355, 292
See application file for complete search history.

(56) References Cited

U.S. PATENT DOCUMENTS

| | | | | |
|---|---|---|---|---|
| 1,584,699 | A | * 5/1926 | Davenport | F16K 5/222 137/246.12 |
| 2,011,113 | A | 8/1935 | Neuhaus | |
| 2,360,599 | A | 10/1944 | Volpin | |
| 2,461,041 | A | * 2/1949 | Donaldson | F16K 5/0271 137/246.22 |
| 2,647,720 | A | * 8/1953 | Volpin | F16K 5/225 137/246.22 |
| 2,726,929 | A | * 12/1955 | Richter | C01G 19/00 423/544 |
| 2,911,187 | A | * 11/1959 | Owsley | F16K 5/185 251/316 |
| 3,107,080 | A | * 10/1963 | Priese | F16K 31/1635 92/72 |
| 3,133,722 | A | * 5/1964 | McGuire | F16K 5/185 251/317 |

(Continued)

FOREIGN PATENT DOCUMENTS

GB     2143930 B     7/1986
KR     101930393 B1     12/2018

*Primary Examiner* — John Bastianelli
(74) *Attorney, Agent, or Firm* — Foley & Lardner LLP

(57) ABSTRACT

A plug valve assembly has a valve body with an inlet and an outlet each defining a fluid passageway in fluid communication with a cavity defined within the valve body. The valve body further has a collar defining a service opening extending upward from the valve body. A plug with a spindle top and a plug body is disposed within the cavity. The plug has an opening that is operable to obstruct the fluid passageway when it is in a closed position and to connect the inlet to the outlet when it is in an open position. The spindle top of the plug has a hexagonal outer profile and a through opening and adaptable to engage with a variety of actuating devices. A threaded cap is removably engaged with the collar of the valve body and is operable to retain the plug within the valve body cavity.

20 Claims, 6 Drawing Sheets

(56) References Cited

U.S. PATENT DOCUMENTS

| | | | | |
|---|---|---|---|---|
| 3,315,697 | A * | 4/1967 | Oliver | F16K 27/107 |
| | | | | 251/315.08 |
| 4,175,577 | A * | 11/1979 | Kacal | F16K 5/0636 |
| | | | | 251/315.08 |
| 4,506,696 | A * | 3/1985 | von Pechmann | F16K 5/182 |
| | | | | 251/312 |
| 9,897,223 | B1 * | 2/2018 | Roberts | F16K 25/00 |
| 2020/0025296 | A1 | 1/2020 | Cuiper | |

* cited by examiner

PLUG VALVE ASSEMBLY

FIELD

The present disclosure relates to fluid conduits and associated equipment, and in particular, to a plug valve assembly that may be used to regulate high flow rate and high-pressure fluids commonly used in hydraulic fracturing applications.

BACKGROUND

Hydraulic fracturing is a process to obtain hydrocarbons such as natural gas and petroleum by injecting a fracking fluid that is a mixture of water, chemicals, and proppant at high pressure into a wellbore to create cracks in deep rock formations. In a typical hydraulic fracturing operation, the subterranean well strata are subjected to tremendous pressures in order to create fluid pathways to enable an increased flow of oil or gas reserves that may then be brought up to the surface. The fracking fluids are pumped down the wellhead by high-pressure pumps located at the well surface. The hydraulic fracturing process employs a variety of different types of equipment at the site of the well, including one or more positive displacement pumps, slurry blender, fracturing fluid tanks, high-pressure flow iron (pipe or conduit), wellhead, valves, charge pumps, and trailers upon which some equipment are carried. In hydraulic fracturing operations, plug valves are commonly used in the flow irons to regulate the flow of the fluid.

DETAILED DESCRIPTION

Figure 1:
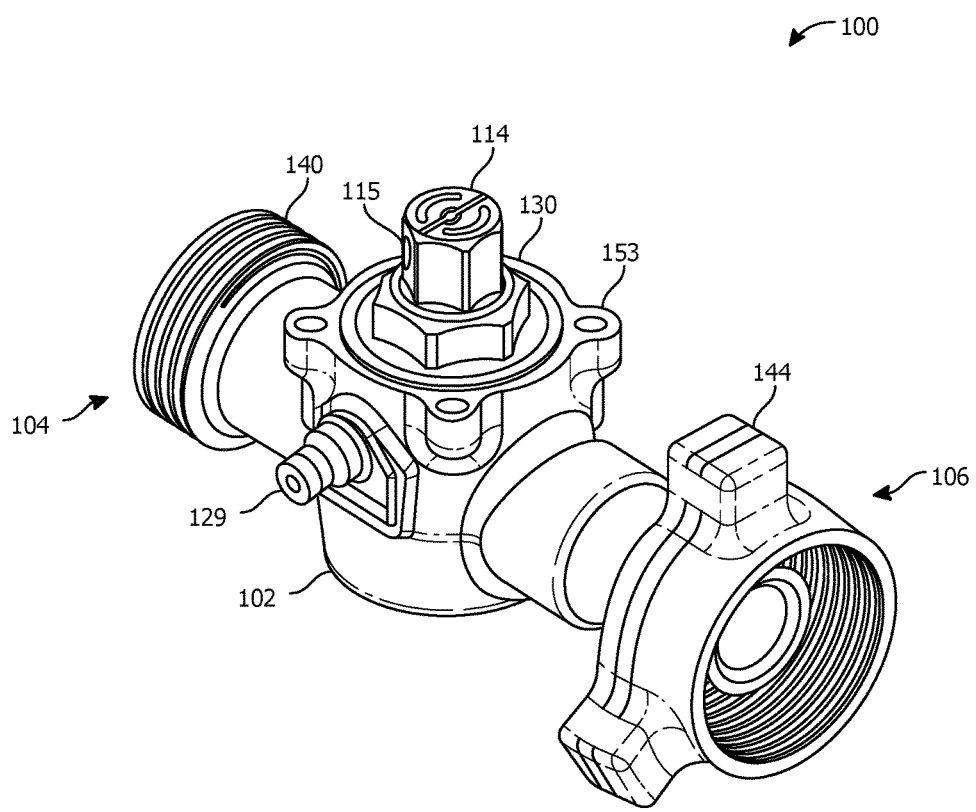
FIG. 1 is a perspective view of an example embodiment of a plug valve assembly according to the teachings of the present disclosure.
Figure 2:
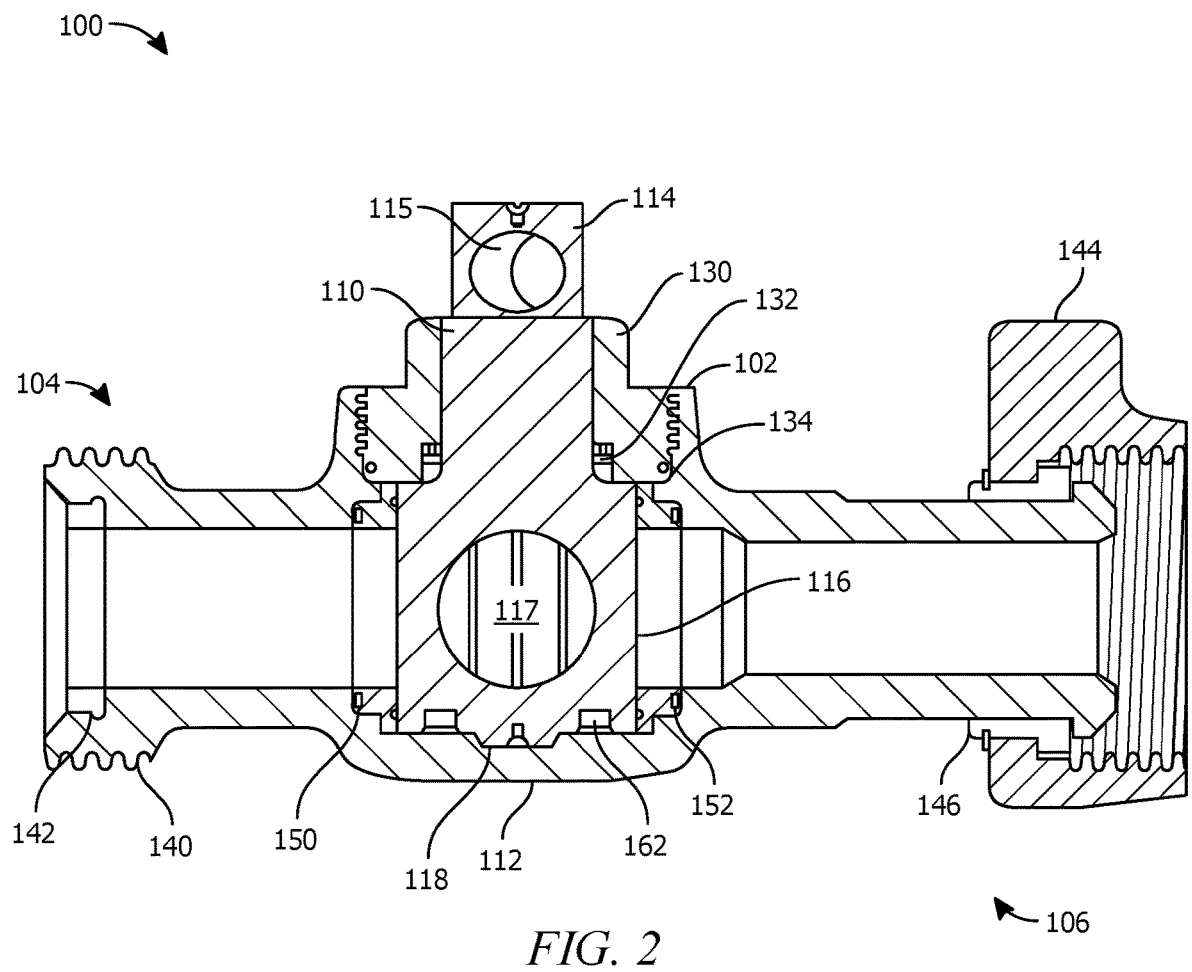
FIG. 2 is a side cross-sectional view of an example embodiment of a plug valve assembly according to the teachings of the present disclosure.
Figure 3:
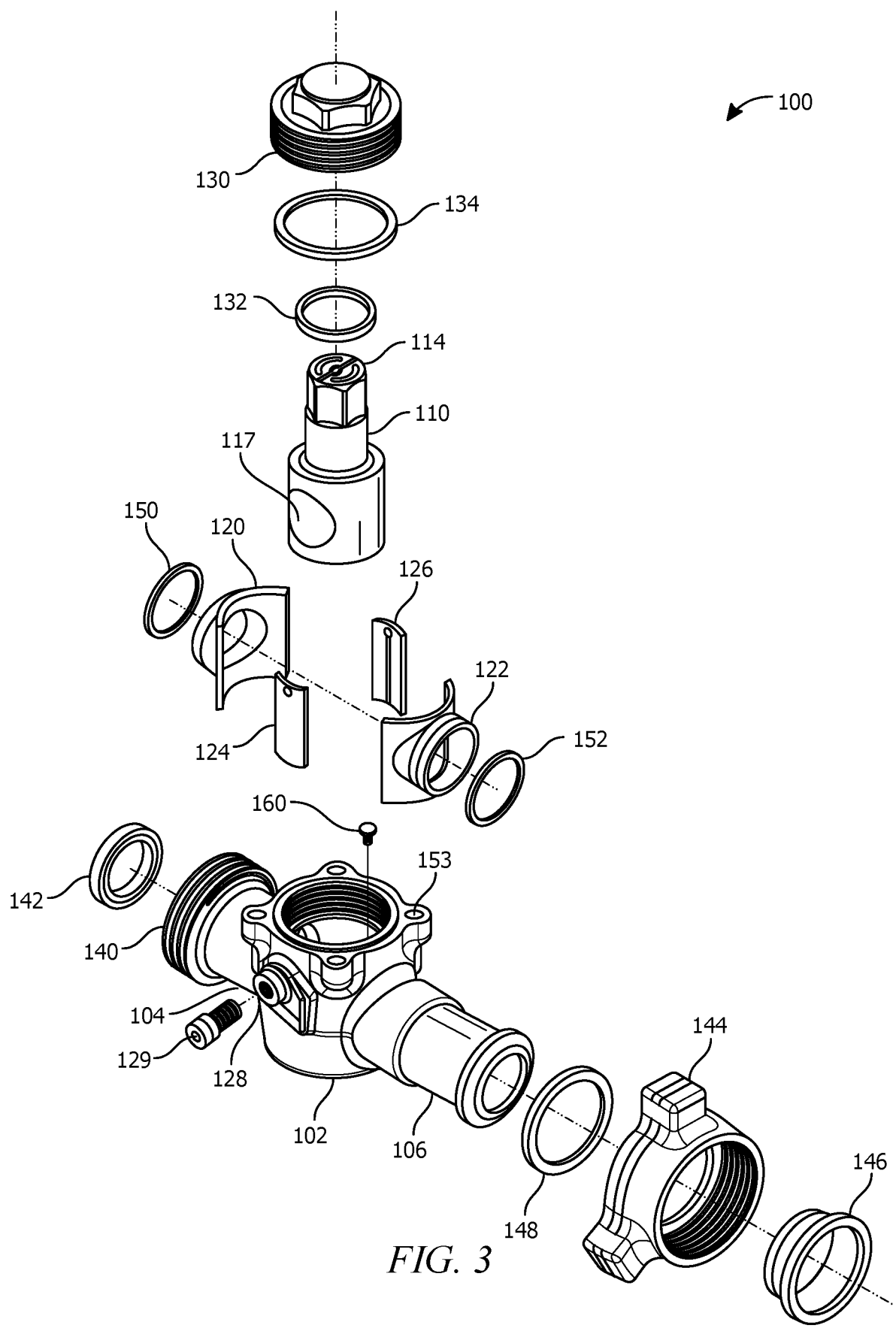
FIG. 3 is an exploded view of an example embodiment of a plug valve assembly according to the teachings of the present disclosure.

Because plug valves used in hydraulic fracturing applications are subject to harsh conditions, including high pressure, continuous-duty, and corrosive and high abrasive liquids, they can be short-lived and may require frequent maintenance and servicing if improperly designed. It is desirable that these valves can be manufactured with an optimal cost structure without sacrificing quality, and are easier to install and service. The plug valve assembly described herein has about a 50% reduction in weight and approximately 50% reduction in manufacturing cost compared to prior valves. The significant weight reduction makes it possible to install the plug valve in the flow iron with fewer personnel. Maintenance of the new plug valve is also less time-consuming because it can be serviced via an access opening at the top of the valve assembly, so it may remain in-line during maintenance. The new design also allows it to be easily adaptable to various actuation devices to operate (open and close) the valve.

Referring to the various views shown in FIGS. 1-7, an embodiment of the plug valve assembly 100 includes a valve body 102 coupled to an inlet 104 and an outlet 106 that form a fluid passageway through which the slurry can flow when the plug valve is in the open position. Positioned within a generally cylindrical cavity formed within the valve body 102 is a generally cylindrical plug body 116 of a plug 110 that is centered and disposed in a circular seat 112 defined on the floor of the valve body 102. The plug 110 includes a spindle top 114 coupled to the plug body 116 and a circular base 118 that extends beyond the bottom face of the plug body and is accommodated in the circular seat 112. The spindle top 114 may have a hexagonal profile to enable easy manipulation with a conventional wrench. The spindle top 114 also has a through opening 115 that can accommodate an elongated tool that may be used to manually rotate the plug 110 within the valve body 102. The plug body 116 is operable to rotate within the valve body cavity about a center axis. The plug body 116 has a through opening 117 that forms a fluid passageway when the plug body 116 is rotated to the open position so that the axis of the opening 117 in alignment with the fluid passageways in the inlet 104 and outlet 106. When the plug body 116 is rotated so that the axis of its opening 117 is perpendicularly oriented to the fluid passageways of the inlet and outlet, the plug valve is in the closed position.

Enveloping the plug body 116 within the cavity of the valve body 102 is a sleeve composed of a number of inserts: inlet insert 120, outlet insert 122, and spacer plates 124 and 126. Defined on the inward-facing surfaces of these inserts are channels 127 that allow a lubricant to be distributed around the plug body 116 to facilitate its rotation within the cavity of the valve body 102. These channels 127 are in fluid communication with a grease port 128 formed in the valve body 102. A grease fitting 129 is removably accommodated in the grease port 128 to close it off to the environment. A lubricant is pumped in through the grease port 128 when the plug valve assembly is serviced. An externally-threaded cap 130 with a hexagonal profile has a threaded engagement with an internally-threaded collar extending upward from the valve body 102 and is used to retain the plug 110 within the valve body cavity. Its hexagonal profile enables the cap 130 to be easily removed without requiring the use of special tools. A packing seal 132 and an O-ring 134 are incorporated with the cap 130 to maintain fluid sealing integrity of the cap.

The inlet 104 of the plug valve assembly 100 also includes external threads 140 and a seal ring 142. The outlet 106 of the plug valve assembly 100 incorporates a hammer union nut 144 with a segmented ring 146 and a retaining ring 148. The inlet insert 120 and the outlet insert 122 also incorporates annular face seals 150 and 152, respectively that provides sealing engagement of the inserts to the valve cavity. The valve body 102 further incorporates a plurality of threaded holes 153 that are operable to receive threaded fasteners to engage and secure various forms of actuation devices to operate the plug valve.

Figure 4:
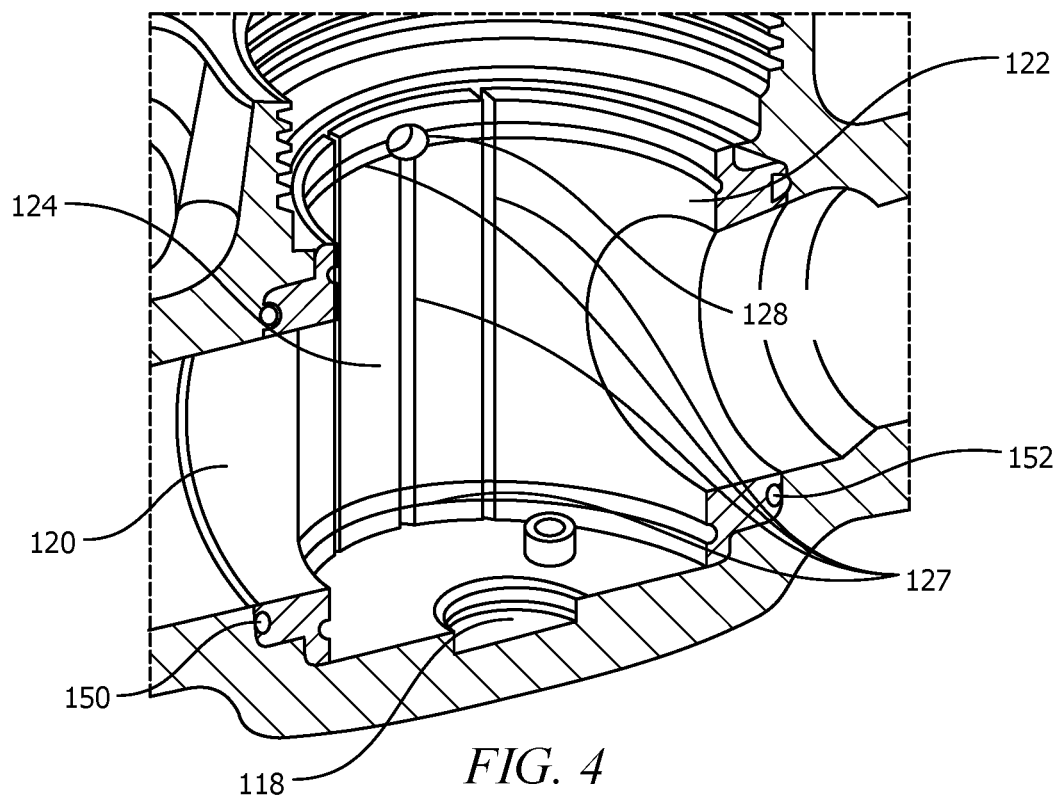
FIGS. 4-6 are partial close-up views of various parts of an example embodiment of a plug valve assembly according to the teachings of the present disclosure.
Figure 5:
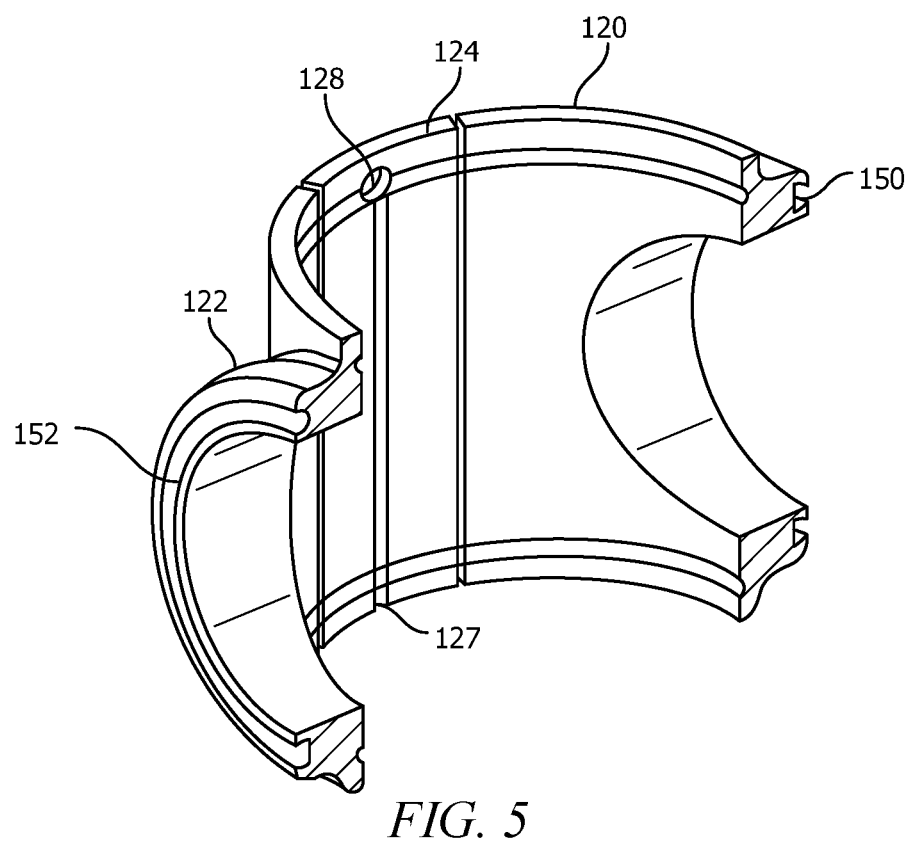
Figure 6:
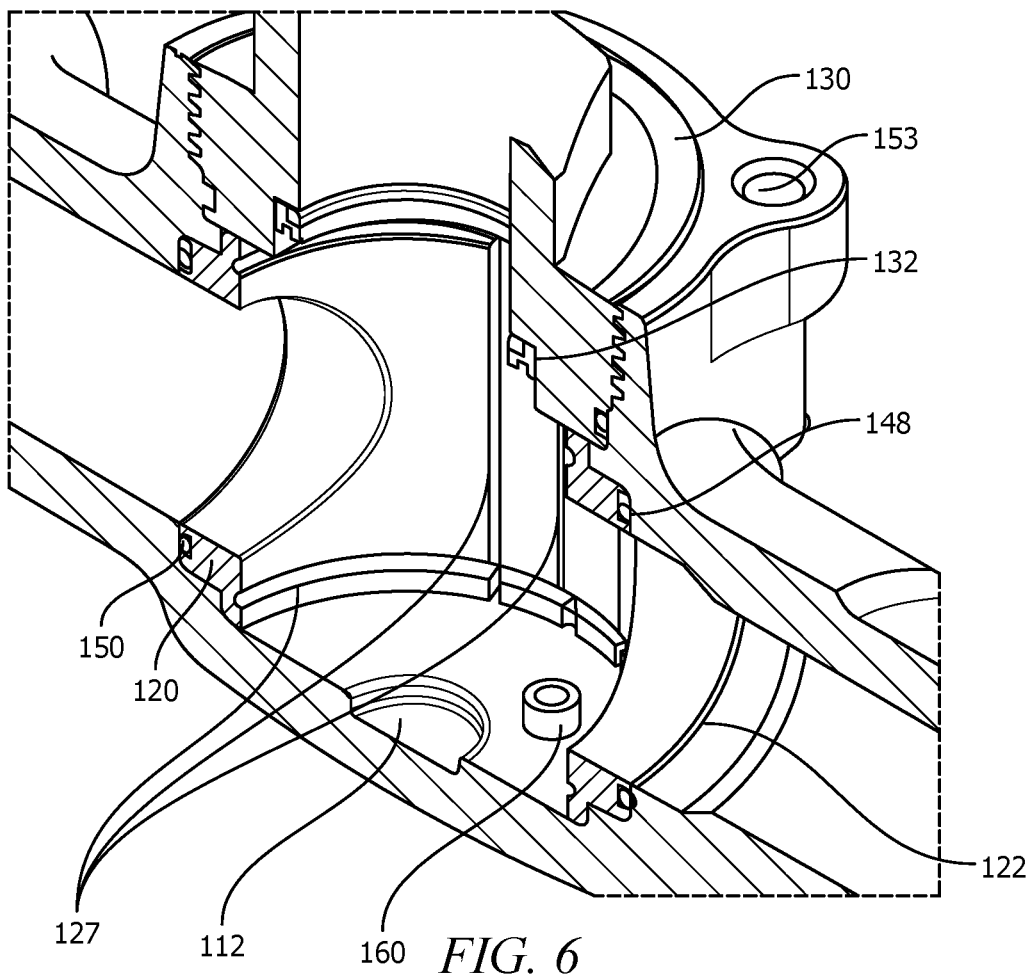

Referring in particular to FIGS. 4-6 for a more detailed view of a plurality of channels 127 that are defined in the inlet insert 120, outlet insert 122, and spacer plates 124 and 126. These channels 127 enable a lubricant to be distributed around the plug body 116 at the interface between the plug body 116 and the valve body 102. The channels 127 are in fluid communication with the grease port 128 and may extend vertically and circumferentially around the plug body 116 to reduce lock-up of the plug valve.

Figure 7:
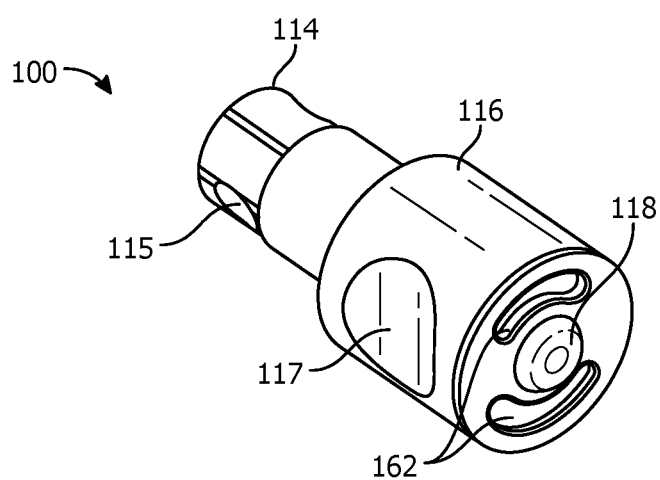
FIG. 7 is a bottom perspective view of an example embodiment of a plug valve body according to the teachings of the present disclosure.

FIG. 7 is a more detailed view of the plug 110. The plug 110 includes a hexagonal spindle top 114 with a through opening 115 that is disposed at the top of the plug body 116. The plug body 116 defines an opening 117 that enables fluid flow therethrough when the plug 110 is placed in the open position within the valve body 102. At the bottom face of the plug 110 is a circular base 118 that extends beyond the bottom face of the plug body. The circular base 118 has dimensions (e.g., diameter and height) that correspond to the dimensions of the circular seat 112 situated on the floor of the cavity defined within the valve body 102. The circular base 118 enables the plug 110 to rotate about a vertical axis within the valve cavity so that the plug valve 100 may be selectively manipulated to be in the open position or the closed position. The plug valve is open when the through opening 117 of the plug body 116 is in alignment with the axis of the fluid passageways defined within the inlet 104 and outlet 106, and the plug valve is closed when the plug 110 is rotated so that the through opening 117 is perpendicular to the axis of the fluid passageways in the inlet and outlet. The floor of the valve body cavity further includes an upwardly protruding nub 160 (shown implemented as a socket head screw) offset from the center of the circular seat 118. The nub 160 is accommodated in an indented arc or groove 162 defined on the bottom surface of the plug body 116. The groove 162 defines the travel path for the nub 160 within the groove 162, which in effect defines the rotation limits for the plug body 116 to be in the open or closed position. For example, the plug 110 can only be rotated clockwise 90 degrees to open the valve and counterclockwise 90 degrees to close the valve, or vice versa.

Figure 8:
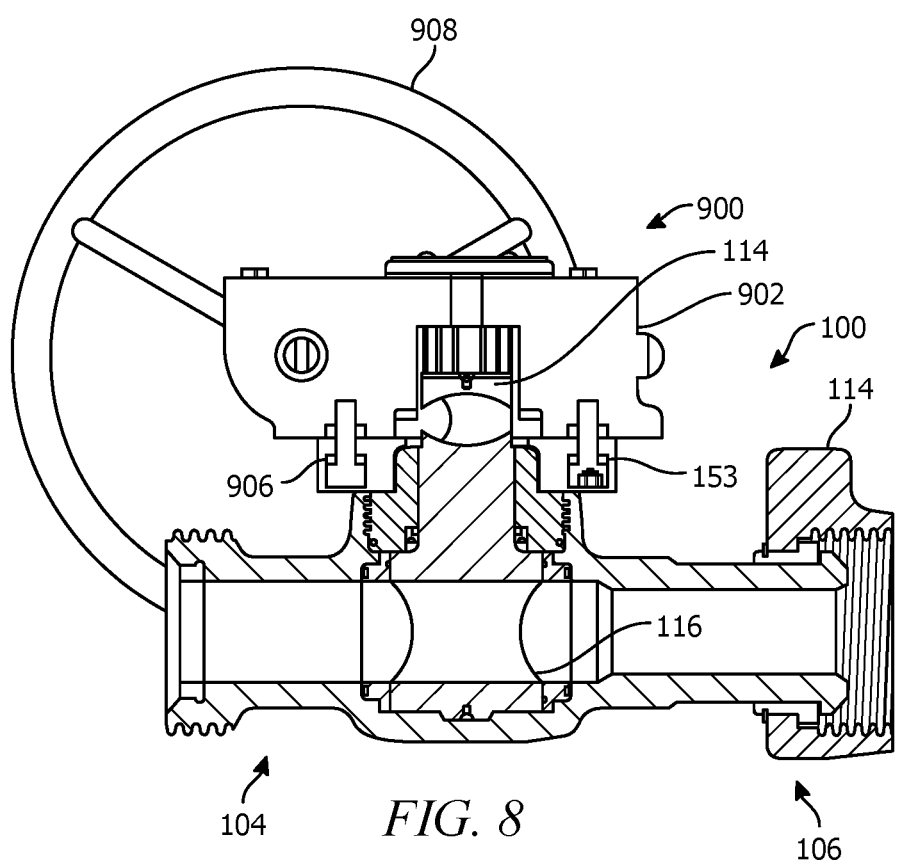
FIG. 8 is a side cross-sectional view of an example embodiment of a plug valve assembly incorporating a gearbox actuating mechanism according to the teachings of the present disclosure.

FIG. 8 is a cross-sectional view of an example of a plug valve assembly 100 incorporating a gearbox actuator device 900 according to the teachings of the present disclosure. The gearbox actuator device 900 includes a gearbox 902 that is secured to the plug valve assembly 100 with four fasteners 906 that are inserted in the four threaded openings 153 of the valve body. The gearbox 902 includes mechanism that engages the hexagonal spindle top 114 of the plug 110. The hexagonal spindle top 114 and the plug body 116 is rotated by manually turning a wheel 908 coupled with the mechanism housed inside the gearbox 902. The gearbox actuator device 900 is one way that the plug valve assembly 100 may be opened and closed. The design of the plug valve assembly 100 enables it to be operable with other existing actuation devices, such as air and hydraulic actuation devices known in the art.

To service the plug valve assembly 100, the cap 130 is rotated using a conventional tool such as a wrench to remove it from the valve body 102. Once the cap is removed, the plug 110 is accessible and may be lifted out from the valve body cavity. The plug 110, the seals, and the inserts retained with in the cavity of the valve body can then be serviced and replaced if needed.

It should be noted that the inlet insert 120, outlet insert 122, and spacer plate inserts 124 and 126 may form an integral liner or sleeve that serves as the interface between the valve body cavity wall and the plug body or they may be constructed of separate individual inserts that can be assembled within the cavity of the valve body.

It should be noted that the parts and components of the plug valve assembly may be fabricated from suitable metals and materials using suitable means including forging, casting, and machining. Moreover, although the plug valve assembly has been described within the context of hydraulic fracking conduit and equipment, its uses and applications should not be so limited.

The features of the present invention which are believed to be novel are set forth below with particularity in the appended claims. However, modifications, variations, and changes to the exemplary embodiments described above will be apparent to those skilled in the art, and the novel plug valve assembly described herein thus encompasses such modifications, variations, and changes and are not limited to the specific embodiments described herein.

What is claimed is:

1. A plug valve assembly comprising:
   a valve body having an inlet and an outlet each defining a fluid passageway in fluid communication with a cavity defined within the valve body;
   a plug having a spindle top and having a plug body disposed within the cavity of the valve body and defining a through opening that, when the spindle top is rotated, the plug body rotates within the cavity and is operable to obstruct the fluid passageway when the plug body is in a closed position and operable to connect the fluid passageway of the inlet to the fluid passageway of the outlet when the plug body is in an open position;
   a cap having threaded engagement with the valve body and operable to retain the plug within the valve body cavity;
   a sleeve disposed at an interface between walls of the valve body cavity and the plug body, the sleeve including an inner surface having defined thereon a plurality of channels operable to distribute a lubricant around the plug body to facilitate rotational movement of the plug body within the valve body cavity; and
   a grease port defined in the valve body in fluid communication with the channels defined on the sleeve,
   wherein the sleeve comprises:
      an inlet insert having an opening in alignment with the inlet fluid passageway;
      an outlet insert having an opening in alignment with the outlet fluid passageway; and
      first and second space plate inserts disposed between the inlet insert and the outlet insert.

2. The plug valve assembly of claim 1, wherein the spindle top of the plug has a hexagonal outer profile and a through opening.

3. The plug valve assembly of claim 1, wherein a bottom face of the plug body defines a circular base that is operable to be accommodated within a circular seat defined on a floor of the valve body cavity.

4. The plug valve assembly of claim 1,
   wherein a channel, of the plurality of channels, defined on the inlet insert is in fluid communication with a channel, of the plurality of channels, defined on the outlet insert and in fluid communication with the grease port.

5. The plug valve assembly of claim 1,
   wherein channels, of the plurality of channels, defined on one or more of the inlet insert, the outlet insert, or the first and second space plate inserts are in fluid communication with the grease port.

6. The plug valve assembly of claim 1, wherein a bottom face of the plug body defines a groove that is operable to receive a protruding nub disposed on a floor of the valve body cavity, where the groove effectively defines a rotational travel limit for the plug.

7. The plug valve assembly of claim 1, wherein the valve body further incorporates a collar having defined thereon threaded holes for engaging with threaded fasteners used to secure actuating devices to actuate rotational action of the spindle top.

8. The plug valve assembly of claim 1, further comprising a packing seal disposed at an interface between the plug body and the cap.

9. The plug valve assembly of claim 1, further comprising:
an annular face seal disposed about the inlet at an interface between the inlet insert and the valve body; and
an annular face seal disposed about the outlet at an interface between the outlet insert and the valve body.

10. A plug valve assembly comprising:
a valve body having an inlet and an outlet, each defining a fluid passageway in fluid communication with a generally cylindrical cavity defined within the valve body, and an internally threaded collar defining a service access opening extending upward from the valve body cavity;
a plug having a spindle top and having a plug body disposed within the cavity of the valve body and defining a through opening that, when the spindle top is rotated, the plug body rotates within the cavity and is operable to obstruct the fluid passageway when the plug body is in a closed position and operable to connect the fluid passageway of the inlet to the fluid passageway of the outlet when the plug body is in an open position;
the spindle top of the plug has a hexagonal outer profile and a through opening and is adaptable to engage with an actuating device selected from the group consisting of wrench, manual, air, gearbox, and hydraulic actuating devices;
an externally-threaded cap having a threaded engagement with the collar of the valve body and operable to retain the plug within the valve body cavity;
a sleeve comprising an inlet insert, an outlet insert, and first and second space plate inserts disposed at an interface between walls of the valve body cavity and the plug body, the inserts having defined, on inner surfaces thereof, channels operable to distribute a lubricant around the plug body to facilitate rotational movement of the plug body within the valve body cavity; and
a grease port defined in the valve body in fluid communication with the channels defined on the sleeve; and
a grease fitting removably secured within the grease port.

11. The plug valve assembly of claim 10, wherein a bottom face of the plug body
defines a circular base that is operable to be accommodated within a circular seat defined on a floor of the valve body cavity.

12. The plug valve assembly of claim 10, wherein a bottom face of the plug body defines a groove that is operable to receive a protruding nub disposed on a floor of the valve body cavity, where the groove effectively defines a rotational travel limit for the plug.

13. The plug valve assembly of claim 10, further comprising a packing seal disposed at an interface between the plug body and the cap.

14. The plug valve assembly of claim 10, further comprising:
an annular face seal disposed about the inlet at an interface between the inlet insert and the valve body; and
an annular face seal disposed about the outlet at an interface between the outlet insert and the valve body.

15. A plug valve assembly comprising:
a valve body having an inlet and an outlet each defining a fluid passageway in fluid communication with a cavity defined within the valve body, and a collar defining a service access opening extending upward from the valve body cavity;
a plug having a spindle top and having a plug body disposed within the cavity of the valve body and defining a through opening that, when the spindle top is rotated, the plug body rotates within the cavity and is operable to obstruct the fluid passageway when the plug body is in a closed position and operable to connect the fluid passageway of the inlet to the fluid passageway of the outlet when the plug body is in an open position;
the spindle top of the plug being adaptable to engage with an actuating device selected from the group consisting of wrench, manual, bar, air, gearbox, and hydraulic actuating devices;
a cap removably engaged with the collar of the valve body and operable to retain the plug within the valve body cavity; and
a sleeve disposed at an interface between walls of the valve body cavity and the plug body, the sleeve including an inner surface having defined thereon channels operable to distribute a lubricant around the plug body to facilitate rotational movement of the plug body within the valve body cavity,
wherein the sleeve comprises:
an inlet insert having an opening in alignment with the inlet fluid passageway;
an outlet insert having an opening in alignment with the outlet fluid passageway; and
first and second space plate inserts disposed between the inlet insert and the outlet insert.

16. The plug valve assembly of claim 15, wherein the spindle top of the plug has a hexagonal outer profile and a through opening.

17. The plug valve assembly of claim 15, wherein a bottom face of the plug body defines a circular base that is operable to be accommodated within a circular seat defined on a floor of the valve body cavity.

18. The plug valve assembly of claim 15 wherein one or more of the channels defined on the inserts are in fluid communication with a grease port formed on the valve body.

19. The plug valve assembly of claim 15, wherein a bottom face of the plug body defines a groove that is operable to receive a protruding nub disposed on a floor of the valve body cavity, where the groove effectively defines a rotational travel limit for the plug.

20. The plug valve assembly of claim 15, further comprising:
a packing seal disposed at an interface between the plug body and the cap;
an annular face seal disposed about the inlet at an interface between the inlet insert and the valve body; and
an annular face seal disposed about the outlet at an interface between the outlet insert and the valve body.

* * * * *